United States Patent [19]
Giebler et al.
[11] 3,911,205
[45] Oct. 7, 1975

[54] CIRCUIT ARRANGEMENT FOR CONNECTING TELEGRAPH AND DATA SUBSCRIBERS TO A SWITCHING SYSTEM

[75] Inventors: Fritz Giebler; Peter Rath, both of Munich, Germany
[73] Assignee: Siemens Aktiengesellschaft, Berlin and Munich, Germany

[22] Filed: Jan. 7, 1974
[21] Appl. No.: 431,065

[30] Foreign Application Priority Data
Jan. 16, 1973 Germany............................ 2302024

[52] U.S. Cl. ................................................ 178/2 R
[51] Int. Cl.$^2$ ........................................ H04L 25/00
[58] Field of Search ............ 178/2 R, 2 A, 3, 4.1 R, 178/4.1 C, 74, 69 R, 69 A, 58 R, 68; 307/239, 264; 328/164

*Primary Examiner*—Thomas A. Robinson

[57] ABSTRACT

A circuit arrangement for connecting telegraph and data subscribers to the four-wire interface of a switching system over two-wire single-current lines, comprising an electronically adjustable resistor for setting the subscriber line current, an RC flattening network coupled to the output of the two-wire line and an electronic circuit means connected to the output of said RC network for providing sharp edged pulses to the transmitting lines. The polarity of the two-wire subscriber line for permitting sending from the interface to the subscriber is determined by a switching transistor (T7) operating as a make/break contact. A threshold device provides switching signals to fix the state of the switching transistor. An electronic current-limiting circuit is normally connected in the two-wire subscriber circuit to prevent reflections therein; a second electronic current-limiting device may be employed to prevent short circuits and extraneous voltages.

7 Claims, 3 Drawing Figures

CIRCUIT ARRANGEMENT FOR CONNECTING TELEGRAPH AND DATA SUBSCRIBERS TO A SWITCHING SYSTEM

BACKGROUND OF THE INVENTION

The invention relates to a circuit configuration for connecting telegraph and data subscribers to the four-wire interface of a switching system over two-wire single-current lines.

As generally known, on the subscriber lines teletypewriter networks the signaling and data communication take plate through multistage direct-current telegraphy with high transmitting voltage. The subscribers are connected to the switching system over single-current/double-current converter circuits.

FIG. 1 illustrates a prior art circuit of the frequency type. The teletypewriter illustrated by contacts sk, and receiving magnet EM is connected to the converter circuit over the line L. The transmission of the telegraph characters from the central office to the subscriber takes place through short-circuit keying. The data conversion is effected by means of two polarized telegraph relays: the receiving relay A and the transmitting relay B. The relay U serves to reverse the polarity of the subscriber loop and for connecting the holding circuit (holding resistor RH), which prevents reflections. The line circuit must be set individually for each subscriber through a building-out circuit resistor RL; a balancing network RN is used to balance with a view to minimizing the received distortion. This connecting technique has the following advantages:

a. Direct mode of operation (i.e., the receiver is fed from the central office), resulting in simple and inexpensive circuits in the subscriber's premises.

b. Simple, inexpensive circuits in the central office; the amount of equipment required for the circuits can further be reduced through centralization;

c. Due to the high transmitting voltage, there is ample safeguard against interferences (interference distortions or interference errors) and insensitivity to the influence of contact resistances (e.g. in case of centralization of subscriber line circuits in the central office or in the case of concentrators).

d. Simple measuring methods with inexpensive strong operating instruments.

However, this connecting technique has the following disadvantages:

a. Manual balancing of the line current must be effected for each individual subscriber, by means of the line building-out network resistor.

b. Manual balancing of the distortion for each individual subscriber, by means of balancing networks is required.

c. Monitoring of the electromechanical telegraph relay.

d. High power requirement, high power dissipation if the line lengths are short.

e. High power dissipation if there is a short circuit.

By virtue of commonly assigned U.S. Application Ser. No. 162,914, filed July 15, 1971 it is common knowledge to replace the line building-out network resistor to be set manually by an electronic circuit for the automatic setting of the line current. Hence, in new connections and switching changeovers of teletypewriter networks, no balancing is required in the central office.

An unduly high power dissipation in the case of a short circuit cannot occur by virtue of the electronic building-out network, because it is controlled to attain a high impedence value in the event of a short circuit. The balancing of the distortion for each individual subscriber can be eliminated in a manner likewise known by applying the RC sampling circuit principle. Such a sampling circuit is disclosed in commonly assigned U.S. Application Ser. No. 15,582, filed Mar. 2, 1970. This circuit makes unnecessary the use of the A-relay known from the FIG. 1 circuit. The functions of the A-relay are performed by the electronic RC sampling circuit. However, the circuit according to the aforementioned Application Ser. No. 15,582 also comprises the B-relay with the transfer contact *b*. This relay must be monitored.

An object of the invention is to provide a means for avoiding the monitoring of the converter assembly through the use of electronic elements, instead of the mechanical telegraph relays.

SUMMARY OF THE INVENTION

According to the invention, this object, and others, are achieved in that the transmitter contact of the terminal repeater for transmitting in the direction from the switching system to the subscriber is constructed as a switching transistor operating as a break contact, or as a make contact, and that an electronic current-limiting circuit is employed, instead of the customary holding resistor.

The converter assembly through the use of the invention, no longer needs to be monitored. Only one relay is inserted into the circuit which reverses the polarity of the subscriber loop, operates only once when the call is set up and once when the call is terminated, and requires no monitoring.

The construction of the transmitter contact as a break contact, or as a make contact, is made possible through the use of an electronic current-limitation circuit, instead of the holding resistor. By using an electronic current-limiting circuit the transmitter contact *b* (FIG. 1) connecting the telegraph wire *b*1 of the line L with the positive terminal +TB of the telegraph current source becomes unnecessary. If the transmitter contact *b* is open, i.e., if the line L is not shorted, then an internal impedance of almost 0 is automatically set in the electronic current-limiting circuit. Then, a normal conduction current of approximately 40 mA flows over the line L. However, if the transmitter contact *b* is closed, i.e., if the line L is shorted, a holding current flows from the positive terminal +TB of the telegraph current source over the electronic current-limiting circuit, the transmitter contact *b* and the resistance of the RC sampling circuit to the negative terminal −TB of the telegraph current source. In this case, an internal resistance is set in the electronic current-limiting circuit which corresponds to the holding resistance RH. Thus, the internal resistance of the electronic current-limiting circuit is switched back and forth between two values as a function of the setting of the transmitter contact *b*.

In an advantageous development of the invention the electronic current-limiting circuit is divided into two different circuits, one taking over the logic function of the holding resistor and the other being employed as an electronic safeguard against short circuits and extraneous voltages.

In another advantageous development of the invention the switching transistor is connected to the transistor of the RC sampling circuit which prevents short-duration reflections that could arise during the switching of the switching transistor by reverse charging the subscriber line.

BRIEF OF THE DRAWINGS

The principles of the invention will be more readily understood by reference to the description of a preferred embodiment given hereinbelow in conjunction with the drawings which illustrate a circuit arrangement constructed according to the invention.

DETAILED DESCRIPTION OF THE DRAWINGS

Figure 2:
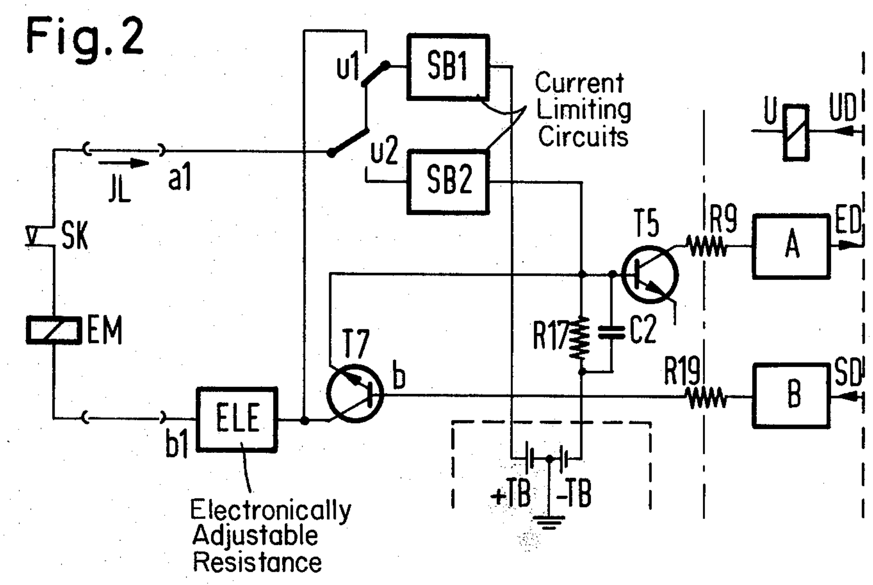
FIG. 2 is a block-schematic diagram of the converter circuit according to the invention.

In the FIG. 2 circuit the grounded central exchange battery TB is employed as a modulation voltage source TB. The electronic building-out network ELE replaces the line building-out network resistor RL in the prior art circuit. The electronic current-limiting circuit SB1 is employed instead of the prior art holding resistor RH; it is connected between the positive terminal +TB of the telegraph current source and the transfer contact *u*1. The electronic current-limiting circuit SB2 is connected between the transfer contact *u*2 and the resistor R17 of the RC sampling circuit for protection against short circuits and extraneous voltages on the line.

Figure 1:
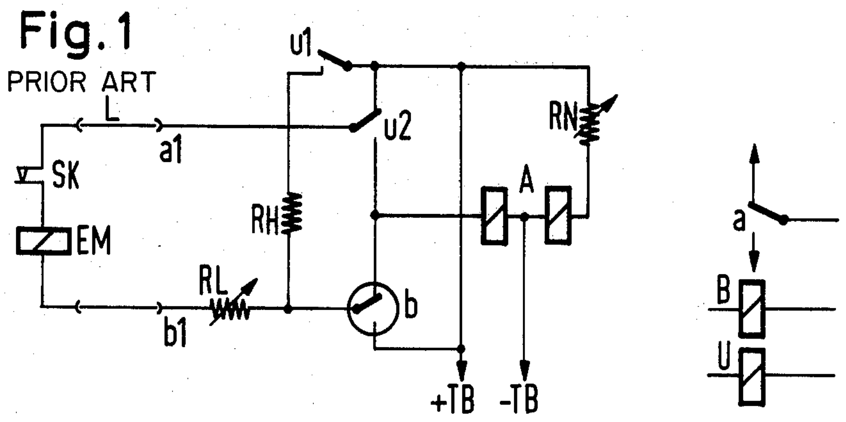
Fig. 1 PRIOR ART
FIG. 1 is a block-schematic diagram of a prior art converter circuit.

The RC network R17, C2 forms the sampling circuit with the transistor T5 (threshold value circuit). The collector of the transistor T5 is connected to the interface between the central office and the converter circuit over a resistor R9 and a matching network A. The threshold value of the threshold value amplifier lies, for example, with a current IR through the resistor R17 of 25 mA. If the current IR is smaller than 25 mA, then the received data ED has the logic potential 1. The function of the transmitter contact (transfer contact) b of the circuit shown in FIG. 1 is taken over by the transistor T7, whose emitter-collector junction is connected between the wire *b*1 of the line and the base of the transistor T5 of the RC sampling circuit. The base of transistor T7 is connected to the interface between the central office and the converter circuit over the resistor R19 and a matching network B. The transistor T7 is conductive if the logic 0 appears in the transmitted data SD. The transistor T7, however, is inhibited if the logic 1 appears in the transmitted data SD.

The following allocation is present in both operating conditions: In quiescent condition, the pole-reversal data, the receiving data ED, and the transmitting data SD have the logic potential 0. The U-relay is in quiescent condition, the transistor T5 is inhibited, and the transistor T7 is conductive. A conduction current *IL* = 5 mA flows on the telegraph circuit. In the connected condition, the pole-reversal data, the receiving data ED and the transmitting data SD have the logic potential 1. The polarity of the U-relay is reversed, the transistor T5 is conductive, and the transistor T7 is inhibited. Then, a current *IL* = 40 mA flows on the subscriber line. The writing from the subscriber to the central office occurs through interruption of the loop (open-circuit keying). In reverse direction, the writing takes place through short-circuit keying.

Figure 3:
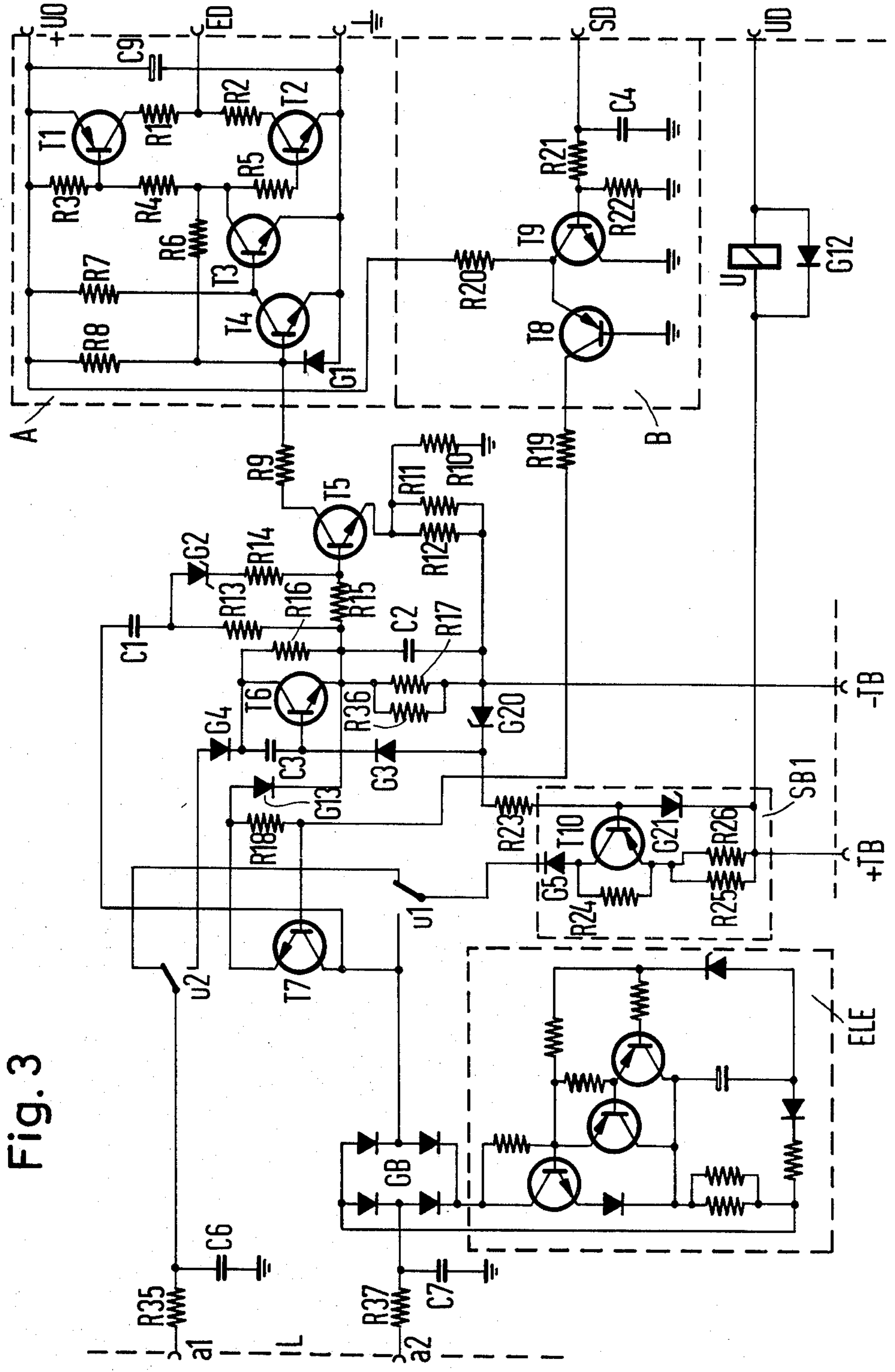
FIG. 3 is a schematic diagram illustrating the FIG. 2 embodiment in greater detail.

FIG. 3 shows in detail the construction of the complete converter circuit. The resistors R36 and R17, as well as the capacitor C2, constitute the RC network of the sampling circuit. The transistor T5 operates as a threshold value amplifier with the voltage dropping resistor R15. The threshold is determined by the voltage divider R10, R11, and R12. The resistor R12 is used for the one-time balancing with a view to minimizing the distortion during the subassembly testing in the test shop. A feedback switching amplifier T4, T3, and R6 with hysteresis is energized over the resistor R9. The transistors T1 and T2 are the transistors of the output switch. The feedback switching amplifier and the output switch constitute the matching network A of the converter circuit to the central office. The matching network B is essentially comprised of the transistors T9 and T8. The transistor T9 operates as an input switch. The energization of the switching transistor T7 takes place over the transistor T8 and the resistors R19, R18.

The RC combination C1, R13, R14, and Zener diode G2 prevent short-duration reflections which may arise during the switching of the transistor T7 by reverse charging of the telegraph circuit L.

The active elements of the two electronic current-limiting circuits SB1 and SB2 are the transistors T6 and T10. The current-limiting circuit SB1 replacing the holding resistor is essentially comprised of the transistor T10, the Zener diode G21 and the resistors R24, R25, and R26. The base potential of the transistor T10 is held in place by the Zener diode G21. In this way, the maximum emitter-collector current of the transistor T10 is determined by the parallel connection of the resistors R25 and R26. The one-time balancing of the maximum emitter current is effected by means of the resistor R26. The resistor R24, which lies parallel to the emitter-collector junction of the transistor T10, takes over a portion of the power dissipation of the transistor.

Basically, the current-limiting circuit SB2 has the same construction as the current-limiting circuit SB1. This circuit is in the loop circuit when it is in its connected condition. The resistors R36 and R17 are employed instead of the resistors R25 and R26. The resistor R16 is used instead of the resistor R24, the Zener diode G20 is used instead of the Zener diode G21. The capacitor C3 and the diode G3 are employed for the slow operation of the current-limiting circuit SB2. In this way, short-circuit keying is ensured during the writing from the central office to the subscriber. The diodes G5, G13, and G4 connected in series with the emitter-collector junctions of the transistors T10, T7 and T6 protect the transistors against inverse operation which could appear as a result of extraneous voltages.

The circuit of the electronic balancing-out network ELE operates as a stongly time-delayed current control. It is identical to the circuit disclosed in the aforementioned U.S. Application Ser. No. 162, 914. The electronic balancing-out network ELE is inserted into the telegraph wire b1 by means of a diode bridge GB.

The pole-reversing function of the transfer contacts u1 and u2 is derived from switching criteria. Such criteria must be monitored from the central office. The central office then can directly control the pole-reversing relay U over a control wire (pole-reversal data UD). Two overvoltage arresters are connected to earth by the telegraph wires *a*1 and *b*1 for the lightning and extraneous-voltage protection. The overvoltage arresters are not shown in the drawing. The RC networks R35, C6, and R37, C7 protect the circuit against voltage peaks before the overvoltage arresters are turned on.

We claim:

1. A circuit arrangement for connecting telegraph and data subscribers to the four-wire interface of a switching system over two-wire single-current lines, comprising an electronically adjustable resistor means (ELE) for setting the subscriber line current comprising an electronically adjustable resistor, a flattening network coupled to the output of the two-wire line and comprising an RC network, electronic circuit means connected to the output of said RC network for generating steep pulse edges, means for reversing the polarity of said two-wire single current lines and permitting sending in the direction from the interface to the subscriber comprising a switching transistor (T7) operating as a break contact or as a make contact interposed in said two-wire single current lines and responsive to the data at said four-wire interface, and an electronic current-limiting circuit (SB1) connected in said two-wire single current lines to take over the logic function of a holding resistor.

2. The circuit arrangement as set forth in claim 1, characterized by the fact that the emitter-collector junction of the switching transistor (T7) is connected between said electronically adjustable resistor (ELE) and said RC network (R17, C2), and including a matching network (B) connecting the base of the transistor (T7) with the interface.

3. The circuit arrangement as set forth in claim 1 including a current source, a first transfer contact (u1) and said electronic currentlimiting circuit (SB1) taking over the logic function of a holding resistor and being connected between the collector of said switching transistor (T7) and one terminal of said current source (+TB), said collector also being connected to one wire of said two-wire single current lines, the other wire of said two-wire line being connected to the other terminal of said current source through a second transfer contact, a second electronic current-limiting circuit operating as an electronic safeguard against short circuits and extraneous voltages on said other telegraph wire and said RC network.

4. The circuit arrangement as set forth in claim 3, characterized by the fact that the first current-limiting circuit (SB1) comprises a transistor (T10) having an emitter connected with said one terminal of the current source (+TB) over a variable balancing resistor (R26), a collector connected with said first transfer contact (*u*1), and a base connected with said one terminal of the current source over a Zener diode (G21), a resistor (R24) being connected across the emitter-collector junction of said current-limiting transistor (T10).

5. The circuit arrangement as set forth in claim 3, characterized by the fact that the second current-limiting circuit (SB2) comprises a transistor having (T6) an emitter connected with said other terminal of the current source (—TB) over a balancing resistor (R17) and with the base of the switching transistor (T7) over a resistor (R18), and a base and a collector connected over a capacitor (c3) (C3) connected with said second transfer contact (*u*2), said base being connected over resistance means (R23, G3) with the base of the transistor (T10) of the first current-limiting circuit (SB1), and to said other terminal of the current source (—TB), a resistor (R16) being connected across the emitter-collector junction of the second current-limiting circuit transistor (T6).

6. The circuit arrangement as set forth in claim 1, wherein the switching transistor has a collector connected to the input of said means for generating steep pulse edges over a circuit comprising means for preventing reflections on said two-wire line during switching of said switching transistor.

7. The circuit arrangement as set forth in claim 6 wherein said means for preventing reflections comprises a capacitor in series with a voltage divider coupled between said switching transistor and said pulse edge generating means.

* * * * *